Sept. 21, 1965     C. P. FORT     3,207,874

CURRENT RESPONSIVE DEVICE

Filed July 31, 1962

INVENTOR
CHARLES P. FORT

BY
ATTORNEY

United States Patent Office 3,207,874
Patented Sept. 21, 1965

3,207,874
CURRENT RESPONSIVE DEVICE
Charles P. Fort, Saugerties, N.Y., assignor to International Business Machines Corporation, New York, N.Y., a corporation of New York
Filed July 31, 1962, Ser. No. 213,794
4 Claims. (Cl. 200—112)

The present invention is directed to a device which operates in response to flow of electrical current, and is particularly appropriate to apparatus, such as a circuit breaker, used to open a point in an electrical circuit.

In the past, circuit controlling devices have presented the problem of introducing excessive electrical resistance at the point at which the controlled circuit is closed and opened. Among the lowest resistance (as well as the most commonly used) devices has been the electro-mechanical type contacts in which metllic bodies are physically brought together to form the junction point. Opening and closing of such contacts may be controlled by any of a number of actuators. However, owing to the inherent, mechanical limitations of the contacts themselves as well as the limitations of the actuators, devices of this type have been relatively slow acting. Further, such devices, unless carefully made and operated, may present relatively high resistance and are apt to perform in a non-uniform fashion. The comment regarding high resistance and non-uniform performance also applies to circuit controlling devices of other classes, such as circuit breakers which employ fusable metal links as the circuit-opening elements.

Accordingly, it is an object of the present invention to provide a new and improved current responsive device.

Another object of the present invention is to provide a new and improved device for controlling an electrical circuit, which device is operative in response to the magnitude of current flowing in the circuit.

Another object of the present invention is to provide a new and improved device responsive to the magnitude of current in an external circuit to open that circuit, and which thereafter may be reset to reclose the circuit.

Another object of the present invention is to provide a device responsive to the level of current in an electrical circuit which has improved operating characteristics.

Another object of the present invention is to provide a new and improved device (such as a circuit breaker) operative in response to the magnitude of current in an external circuit which in its closed condition presents relatively low resistance to the external circuit.

Another object of the present invention is to provide a new and improved device for controlling continuity in an external circuit which has a relatively fast operating time.

Another object of the present invention is to provide a new and improved class of circuit breakers capable of giving substantially uniformly predictable parameters over a wide range of operating current values.

The present invention features the use of conductors having spaced-apart electrically conductive surfaces to be connected to each other by a globular mass of an electrically conductive liquid, and is characterized by the use of adhesive (liquid-to-surface) forces inherent to the liquid and contact surface to hold the mass in place.

The invention featured in a last-named structure is further characterized by the provision of a magnetic field passing in a direction substantially normal to the flow of electrical current through the liquid, so that the motor action between the magnetic field and current urges the liquid from between the conductor surfaces against the adhesive forces.

The foregoing and other objects, features and advantages of the invention will be apparent from the following, more particular description of the preferred embodiment of the invention, as illustrated in the accompanying drawing.

Figure 1:
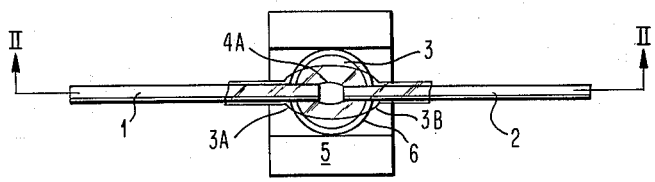
FIG. 1 shows a top view of a circuit breaker.
Figure 2:
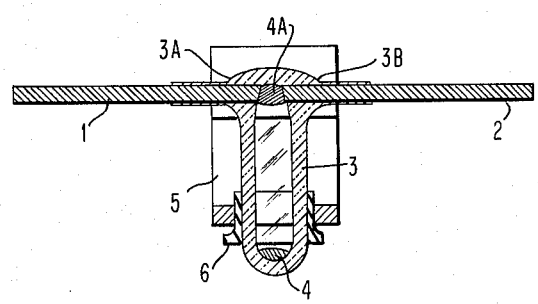
FIG. 2 shows a sectional view taken through II—II of FIG. 1.

Referring to the drawings, the circuit breaker device forming the preferred embodiment of the invention has first and second rod-like, metallic conductors 1 and 2 held in adjacent, coaxial relationship to each other by portions 3A and 3B, respectively, of envelope 3, which is made of electrically non-conductive material. The terminal surfaces of the parts of conductors 1 and 2 embraced by envelope portions 3A and 3B are planar and disposed in opposing, spaced-apart relationship within the cavity of envelope 3. The device is in its normal, operating position when conductors 1 and 2 are (a) adjacent the upper end of envelope 3 and (b) disposed so that their terminal surfaces are closest together adjacent the upwardly-facing side surfaces of the conductors and diverge from each other as the surfaces extend in a downward direction.

With the device including envelope 3 in the above described normal position, a pool of electrically conductive liquid 4 within the cavity of envelope 3 lies at the lower end thereof, i.e., at the cavity end remote from conductors 1 and 2. From this pool is taken a mass of liquid 4A of volume sufficient to fill the space between and electrically join conductors 1 and 2. This filling operation is effected by temporarily inverting the device including envelope 3, and therewith allowing liquid 4 to run between conductors 1 and 2. When the device including envelope 3 is restored to normal position, liquid 4 (less mass 4A) returns to the end of envelope 3 remote from conductors 1 and 2, mass 4A now being retained between the surfaces of conductors 1 and 2 at a point above the main pool of liquid 4 by forces next described.

In addition to having a low specific resistance, liquid 4 is chosen to be adherent to the metallic surfaces of rods 1 and 2 by a force which is sufficiently great with respect to the surface tension inherent to the liquid that the liquid wets (and therefore clings to) the surfaces of rods 1 and 2. In contrast, the material of envelope 3 is chosen to give a liquid-envelope material adhesive force which is sufficiently low with respect to the surface tension of the liquid to prevent liquid 4 from wetting and tending to cling to the material of envelope 3.

With materials of elements 1, 2 and 3 chosen with respect to liquid 4 in the above described fashion, and with the device including envelope 3 in its normal position, the surface of the liquid mass 4A lying between conductors 1 and 2 which is not in contact with the surfaces of conductors 1 and 2 is contracted by its surface tension, so that mass 4A is urged into a globule. At the same time, the above mentioned adhesive forces between the surface of conductors 1 and 2 and the liquid of mass 4A tends to restrain the globule to lie between conductors 1 and 2 (and consequently, from falling back into the pool of liquid 4 at the bottom of envelope 3). The surface areas of conductors 1 and 2 and the separation therebetween are chosen to give a volume-area ratio of value sufficient (in view of the above mentioned adhesion surface tension ratio inherent to the choice of materials) to allow mass 4A to be held in place between the surfaces of conductors 1 and 2. It is to be seen that when there is applied to mass 4A an additional force which, in combination with the normal gravitational force on mass 4A, exceeds the adhesive force restraining the globule, globular mass 4A is removed from between conductors 1 and 2. As indicated above, the amount of force required to effect such removal is dependent upon the dimensions of the apparatus, as well as physical constants inherent to the various elements involved. The manner in which this additional force is applied to mass 4A is next described.

Figure 3:
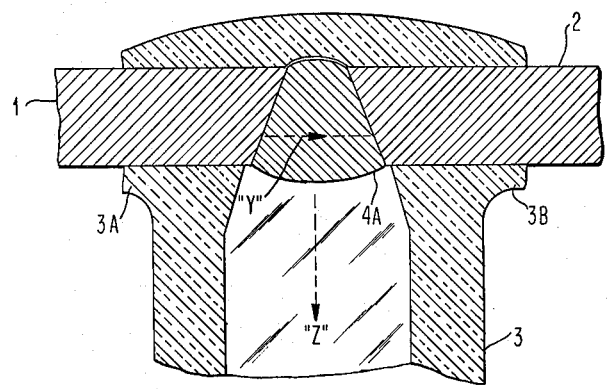
FIG. 3 shows an enlarged view of a portion of FIG. 2.
Figure 4:
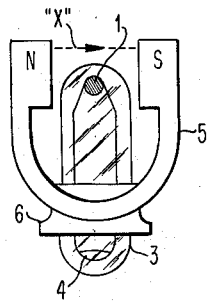
FIG. 4 shows an end view of the circuit breaker of FIG. 1.

In the present invention, the above mentioned additional force is of electro-magnetic origin and is provided in the following manner. Electrical current flows through conductor 1, mass 4A, and conductor 2 as the result of the connection of those elements in series with an electrical circuit (not shown). It also is to be seen that the circuit may be opened by removing mass 4A from between the surfaces of conductors 1 and 2, and the further flow of current in the circuit prevented. For purposes of explanation, it is assumed that current flowing from conductor 1 to conductor 2 through liquid mass 4A follows a path in mass 4A which is substantially parallel to the line indicated in FIG. 3 as "Y." The current flowing through mass 4A parallel to Y acts in combination with magnetic flux which passes through mass 4A in a direction (indicated in FIG. 4 as "X") substantially normal to Y. As a consequence of the current flowing through the magnetic field, a resultant force normal to both X and Y is generated. The above mentioned flux may be from any suitable source, such as an electro magnet where field strength might be regulated. However, in the presently described preferred embodiment, permanent magnet 5 is used as a flux source. The poles of magnet 5 are disposed on opposite sides of envelope 3, magnet 5 being oriented so that at least a part of the substantially parallel and horizontally extending flux lines pass through the space between conductors 1 and 2, which now is occupied by mass 4A, and so that the above mentioned resultant force is directed downwardly (in the direction shown as "Z" in FIG. 3). This electromagnetic force is proportional to the product of the flux density (which may be measured in terms of field strength, since the field produced by magnet 5 is assumed to be of uniform strength) and current density (which may be measured in terms of current flow, since the effective cross sectional area of mass 4A remains substantially constant prior to removal of the globule from between conductors 1 ad 2). With the strength of the magnetic field held at a constant level, the force on mass 4A is proportional to the current flow in the Y direction. Therefore the current flow through the device increases until the total force (gravitational and electro magnetic) exerted on mass 4A in the Z direction exceeds the above described forces restraining mass 4A between conductors 1 and 2. At such a time mass 4A is expelled downwardly from between conductors 1 and 2 to open the above described circuit and falls into the pool of liquid 4. The purpose of the downwardly diverging orientation of the surfaces of conductors 1 and 2 makes the removal of liquds 4A from between the conductors tend to go to completion once the removal of liquid has started.

The force tending to hold mass 4A between conductors 1 and 2 is directly proportional to the ratio of the above described adhesive to surface tension forces and (within limits) to the area of the conductor 1 and 2 surfaces, and is an inverse function of the spacing between the conductors. In a device of the above description in which liquid 4 is mercury, the surfaces of conductors 1 and 2 are silver plated tungsten, and the material of envelope 3 is flint glass, it is possible to make a circuit breaker of rating governed within relatively wide limits by the above described dimensional parameters.

In order to maintain envelope 3 and conductors 1 and 2 in spaced relationship with respect to the pole faces of magnet 5 and in order to provide a degree of protection to envelope 3, magnet 5 is made in a U-shape with an opening passing through its cross member. A lower portion of envelope 3 is surrounded by a snugly-fitting grommet 6, envelope and grommet being received within the above described opening. Grommet 6 is made of resilient material, and fits snugly against the walls of the opening therewith positioning and retaining envelope 3 with respect to magnet 5.

While the invention has been particularly shown and described with reference to a preferred embodiment thereof, it will be understood by those skilled in the art that various changes in form and details may be made therein without departing from the spirit and scope of the invention.

What is claimed is:
1. In a device to be connected in series with an electrical circuit,
   first and second conductors having terminal surfaces of a given material,
   an envelope of non-conductive material having portions to receive and dispose said conductors in substantially coaxial relationship to each other and to dispose said surfaces in spaced-apart relationship within a cavity of said envelope,
   said envelope and said conductor receiving portions normally being oriented to maintain said conductor surfaces above the lower extremity of said cavity,
   a mass of liquid capable of wetting said surfaces and conducting electrical current,
   at least a part of said mass normally being disposed to lie in the space between said conductor surfaces and retained against gravity and other downwardly acting forces by adhesive forces acting between said liquid and said conductor surfaces and effective to conduct current from one to the other of said conductors,
   and a permanent magnet having pole faces disposed on opposite sides of said envelope to generate lines of flux which extend in a direction both horizontal and normal to the direction of current flow through that part of said liquid retained between said surfaces,
   said magnet pole faces being oriented with respect to the direction of current flow through said mass to generate therein a resultant force in a downward direction.
2. In a device to be connected in series with an electrical circuit,
   first and second conductors having substantially planar terminal surfaces of given material,
   an envelope of non-conductive material having portions to receive and dispose said conductors in substantially coaxial relationship with respect to each other,
   said envelope having a cavity therein in which said surfaces are disposed in spaced-apart, diverging relationship,
   said envelope normally being positioned to orient said surfaces to diverge in a downwardly extending direction,
   a mass of liquid capable of wetting said surfaces and conducting electrical current,
   at least a part of said mass normally being disposed to lie in the space between said conductor surfaces and retained by adhesive forces acting between said liquid and said conductor surfaces, and effective to conduct electrical current from one to the other of said conductors, and a permanent magnet having pole faces disposed on opposite sides of said envelope to generate lines of flux extending in a direction both horizontal and normal to the direction of current flow in the part of said liquid retained between said surfaces, said magnet pole faces being further oriented with respect to the direction of current flow through said mass to generate therein a resultant force in a downward direction.

3. The device set forth in claim 2 wherein said permanent magnet has a common cross member from which arms extend to said pole faces, and having an opening through said cross member to receive the lower extremity of said envelope.

4. The device set forth in claim 3 having in addition:
a grommet of resilient material surrounding the portion of said envelope received within said cross member opening and snugly fitting against the walls formed thereby in said cross member.

References Cited by the Examiner

UNITED STATES PATENTS 2,844,688  7/58  Pfann _____ 200—112

BERNARD A. GILHEANY, *Primary Examiner.*

ROBERT K. SCHAEFER, *Examiner.*